United States Patent [19]

Müller-Erwig

[11] Patent Number: 4,587,872
[45] Date of Patent: May 13, 1986

[54] METHOD AND APPARATUS FOR PRODUCING V-BELTS

[75] Inventor: Horst Müller-Erwig, Neustadt, Fed. Rep. of Germany

[73] Assignee: Hermann Berstorff Maschinenbau GmbH, Fed. Rep. of Germany

[21] Appl. No.: 721,944

[22] Filed: Apr. 11, 1985

[30] Foreign Application Priority Data

Apr. 18, 1984 [DE] Fed. Rep. of Germany ........ 3414674

[51] Int. Cl.$^4$ .............................................. B26D 7/14
[52] U.S. Cl. ......................................... 83/18; 83/175; 83/925 EB
[58] Field of Search ...................... 83/175, 925 EB, 18, 83/432, 187

[56] References Cited

U.S. PATENT DOCUMENTS

| | | | |
|---|---|---|---|
| 1,473,642 | 11/1923 | Reichel | 83/432 |
| 1,611,731 | 12/1926 | Russell et al. | 83/175 X |
| 2,410,905 | 11/1946 | Slusher | 83/175 X |
| 3,701,186 | 10/1972 | Kuts | 83/432 X |
| 4,488,465 | 12/1984 | Brand et al. | 83/175 |

Primary Examiner—Donald R. Schran
Attorney, Agent, or Firm—Schwartz, Jeffery, Schwaab, Mack, Blumenthal & Evans

[57] ABSTRACT

A method and apparatus for producing open-sided V-belts by cutting from a vulcanized, sleeve-shaped roll. The sleeve-shaped roll is disposed over two drivable rollers. A tensioning arrangement which includes one of the rollers has a weight. This weight acts solely on such roller tending to pull this roller away from the other roller. This tensions the roll. When the tensioning force attains a predetermined limit, it is partially counteracted by a force acting in the opposite direction. The counteracting force is supplied by suitable means. Cutter means are provided for cutting the roll while it is tensioned and the counteracting force is increased by suitable means in dependence upon the number of belts cut from the roll.

18 Claims, 4 Drawing Figures

METHOD AND APPARATUS FOR PRODUCING V-BELTS

FIELD OF THE INVENTION

The present invention relates to a method and apparatus for producing V-belts. More particularly, the invention relates to a method and apparatus for producing open-sided V-belts from vulcanised sleeve-shaped materials.

BACKGROUND OF THE INVENTION AND PRIOR ART DISCUSSION

In German Offenlegungsschrift No. 3 128 111, there is described an apparatus for producing open-sided V-belts from a sleeve-shaped roll which has been pre-vulcanised. The roll is located over two rollers which are axis-parallel to one another. One of the rollers is subsequently moved away from the other roller so as to increase the axial spacing between the rollers. The roll of material is tensioned during such movement and, whilst tensioned, is cut into individual V-belt which do not require any further processing treatment.

It is necessary to tension the vulcanised roll on the rollers for the cutting operation, but such tensioning has, in practice, proved difficult to achieve. A very high degree of accuracy is needed when cutting V-belts blanks which are already vulcanised. The blanks are in the form of a sleeve-shaped roll. The cutting operation has to be performed within a tolerance of 0.1 mm. This is because, if the belts are used in motor vehicles, any greater inaccuracy in cutting causes the V-belts to produce considerable and unacceptable background noise.

V-belt blanks which are already vulcanised are, obviously, extremely rigid. Additional problems arise when trying to cut the blanks because it is formed from rubber layers or plies which are highly resistant to abrasion. The V-belts need not, however, be pre-vulcanised. Instead, they may be covered with a coating in the form of a very stable, rubberised or rubber-coated fabric to increase abrasion resistance. Such a manufacturing process is, however, complicated because every single V-belt has to be covered with a coating so that it can then be subjected to a vulcanising process in a mould. During vulcanisation in the mould, inaccuracies in respect of dimensions can, in the main, be compensated for with the result that highly accurate cutting operations for unvulcanised V-belts are not necessary.

OBJECT OF THE INVENTION

The invention seeks to provide a method and an apparatus for producing V-belts from vulcanised, sleeve-shaped blanks in which the blanks are tensioned so accurately that a plurality of belts may be cut therefrom with the desired degree of accuracy.

SUMMARY OF THE INVENTION

According to the present invention, there is provided a method of producing open-sided V-belts by cutting from a vulcanised sleeve-shaped roll or winding, the vulcanised roll or winding being disposed around two rollers and being tensioned by means of a tensioning arrangement including one of the rollers, wherein the tensioning of the vulcanised roll is effected by the inherent weight of the tensioning arrangement and, when a predetermined tensioning force limit is attained, partially counteracting the inherent weight of the tensioning arrangement by means of a support unit, the cutting of a V-belt from the roll or winding being effected whilst the roll or winding is tensioned, the cut belt then being removed and the counteracting force of the support unit being increased in dependence upon the number of V-belts already cut and removed from the roll.

In such an arrangement, the vulcanised roll is tensioned by the inherent weight of the tensioning arrangement. Accordingly, the method can be carried out very economically. Moreover, because the method includes a manner of partially counteracting the weight of the tensioning arrangement, the resultant tensioning force acting on the roll can be maintained accurately at a predetermined value in a simple manner. A large number of belts may need to be cut from a roll, which belts may vary in respect of their structure, thickness and length. The roll or rolls will, therefore, need to be tensioned by differing amounts. This, again can be readily achieved utilising the method of the present invention because the counteracting force can be accurately controlled in dependence upon pre-determined parameters.

Such a method therefore permits a very thin vulcanised roll to be cut into V-belts. Such a roll might otherwise rupture if it was subjected only to the inherent weight of the tensioning arrangement. By providing a counteracting force, such a roll can be accurately tensioned at the force which has been pre-determined therefor. In other words, compensation for part of the weight of the tensioning arrangement is utilised. This is of vital importance if the predetermined maximum permissible tensioning force for the roll is less than the tensioning force which would be applied by the weight of the tensioning means in the absence of any counteracting force.

On the other hand, the method of the present invention can equally be used for cutting V-belts from a thick, heavy vulcanised roll. In such a case, a lower proportion of the inherent weight of the tensioning arrangement needs to be counteracted. This is because a thick-coated roll must be tensioned by means of a greater tensioning force so as to be accurately located on the rollers for the cutting operation. Nevertheless, when the empirically determined maximum permissible tensioning force for this roll is then attained, the counteracting force is again brought into operation.

It will be appreciated that each time a belt is severed from the roll and removed from the rollers, the tensioning force acting on the remaining portion of the vulcanised roll will increase. This is because the tensioning force has to be borne by a roll of narrower width. The maximum permissible tensioning force for such a reduced-size roll can also be empirically determined. Accordingly, it is necessary for the compensating force to be increased. This is also achieved by the method of the present invention. Such increase is preferably effected in a gradual manner, that is to say, in a stepwise manner, each time a belt is severed from the roll and removed from the rollers.

The additional cutting operation is, in a preferred embodiment, permitted by monitoring the pressure subsisting in pneumatic or hydraulic cylinders which form part of the counteracting force arrangement. In such a manner, the compensation for the inherent weight of the tensioning arrangement can be achieved by gradually increasing the pressure in the cylinders.

Also according to the present invention, there is provided an apparatus for producing open-sided V-belts by cutting from a vulcanised sleeve-shaped roll or winding, comprising two rollers around which the vulcanised roll or winding is disposed, a tensioning arrangement for tensioning the roll or winding, which arrangement includes one of the rollers, wherein the tensioning arrangement is guided in a frame by means of guide members, whereby the weight of the tensioning arrangement acts, in use, on the roll or winding and support means for at least partially counteracting the weight of the tensioning arrangement.

Preferably, the support means is pneumatically or hydraulically actuated.

Desirably, the tensioning arrangement comprises the tensioning roller, a weight member on which the tensioning roller is mounted, guide bearings mounted on the weight member and piston rods, including their associated pistons, also mounted on the weight member.

Advantageously, the guide members comprise a plurality of shafts which are spaced apart from one another in a parallel relationship, the shafts being guided in the guide bearing. Such arrangements ensure the satisfactory, vertical and substantially frictionless guidance of the tensioning unit and of the support means.

The frame, which is desirable for the guidance of the tensioning unit is formed from a plurality of vertically-disposed columns which are spaced-apart from one another, and which are mounted on and extend between a base plate and cover plate.

Further preferably, the pneumatically or hydraulically actuated support means comprises pneumatic or hydraulic cylinders which co-operate with the tensioning arrangement, such cylinders being disposed on a displaceable crosspiece member. Such an arrangement provides a smooth, jolt-free absorbing device for counteracting part of the inherent weight of the tensioning arrangement. The pneumatic or hydraulic cylinders are secured at one end to the tensioning arrangement by means of the piston rods and, at the other end, are secured to a crosspiece member, which is disposed therebeneath, by means of the cylinders.

Further desirably, contact manometers are connected to the pneumatic or hydraulic cylinders; the contact manometers being connected to a computer, the computer being linked to a control means which acts on the pneumatic or hydraulic cylinders.

Further advantageously, the tensioning arrangement is adapted to be vertically displaceable by means of lifting spindles acting on the support unit.

Still further preferably the support unit comprises the vertically displaceable crosspiece member, which member is displaceable by means of a spindle drive, the pneumatic or hydraulic cylinders being disposed on the crosspiece member.

Such arrangements permit the apparatus to be used for cutting belts of different lengths.

In a desirable embodiment, stop members are mounted on the pneumatic or hydraulic cylinders, which stop members co-operate with limit switches for disconnecting the spindle drive for the support unit. This embodiment prevents the rupture of a roll, which has been disposed over the rollers, due to the inherent weight of the tensioning arrangement. When a tensioning value has been empirically determined and when the pressure in the cylinders has been set accordingly, each of the piston rods is withdrawn from its respective cylinders until the stop member, which is mounted on the cylinders, comes into contact with its limit switch. The spindle drive is thus disconnected. The crosspiece member, on which the cylinders are disposed, and the spindle drive itself then bear the inherent weight of the tensioning arrangement, which weight is compensated for by the cylinders.

In consequence, this measure effectively prevents a vulcanised roll from being overstretched and rupturing.

BRIEF DESCRIPTION OF THE DRAWINGS

One embodiment of an apparatus for producing open-sided V-belts in accordance with the present invention will be further described, by way of example with reference to the accompanying drawings, in which.

DESCRIPTION OF PREFERRED EMBODIMENT

Figure 1:
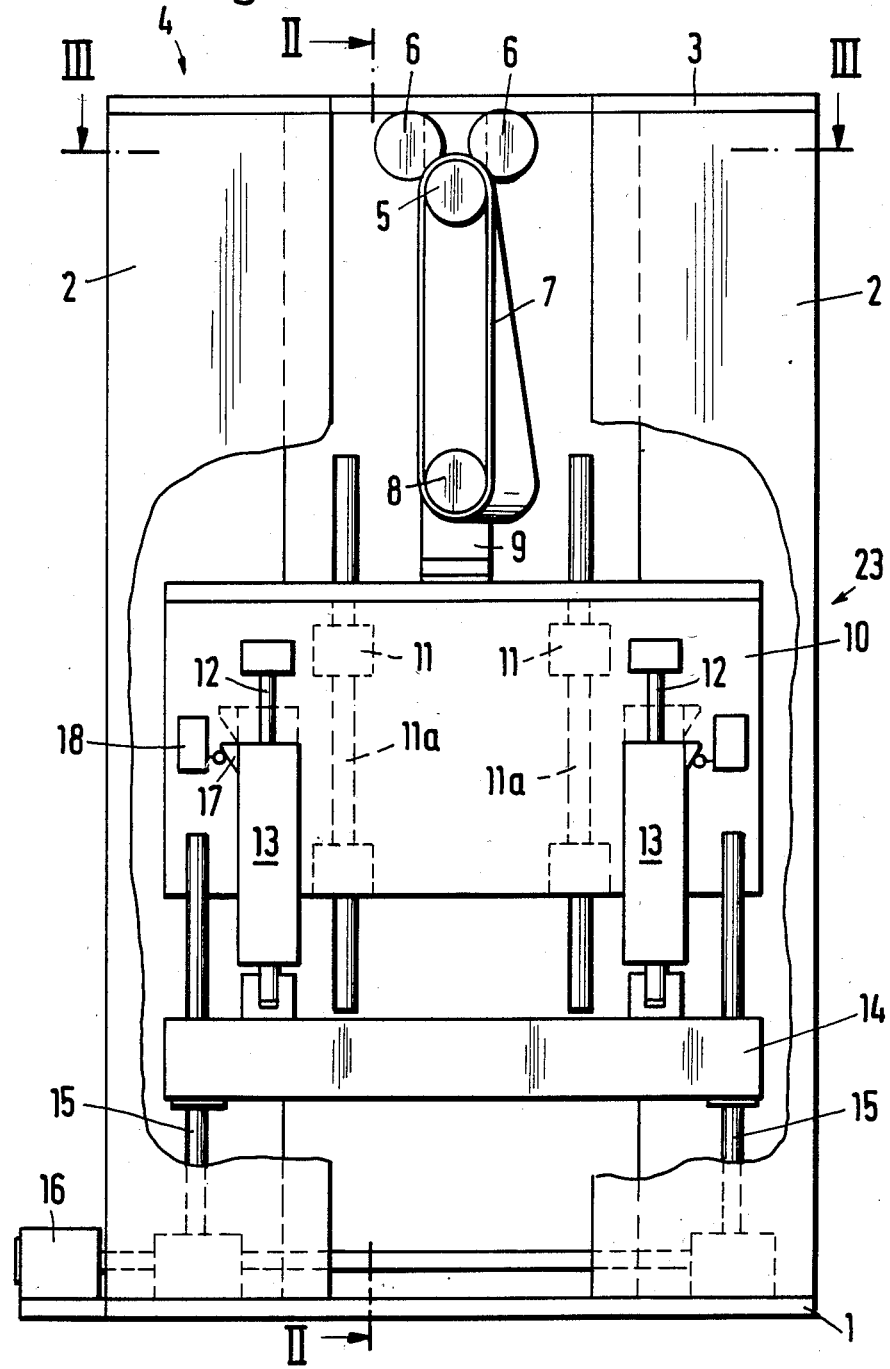
FIG. 1 is a longitudinal sectional view through the apparatus in accordance with the invention.
Figure 2:
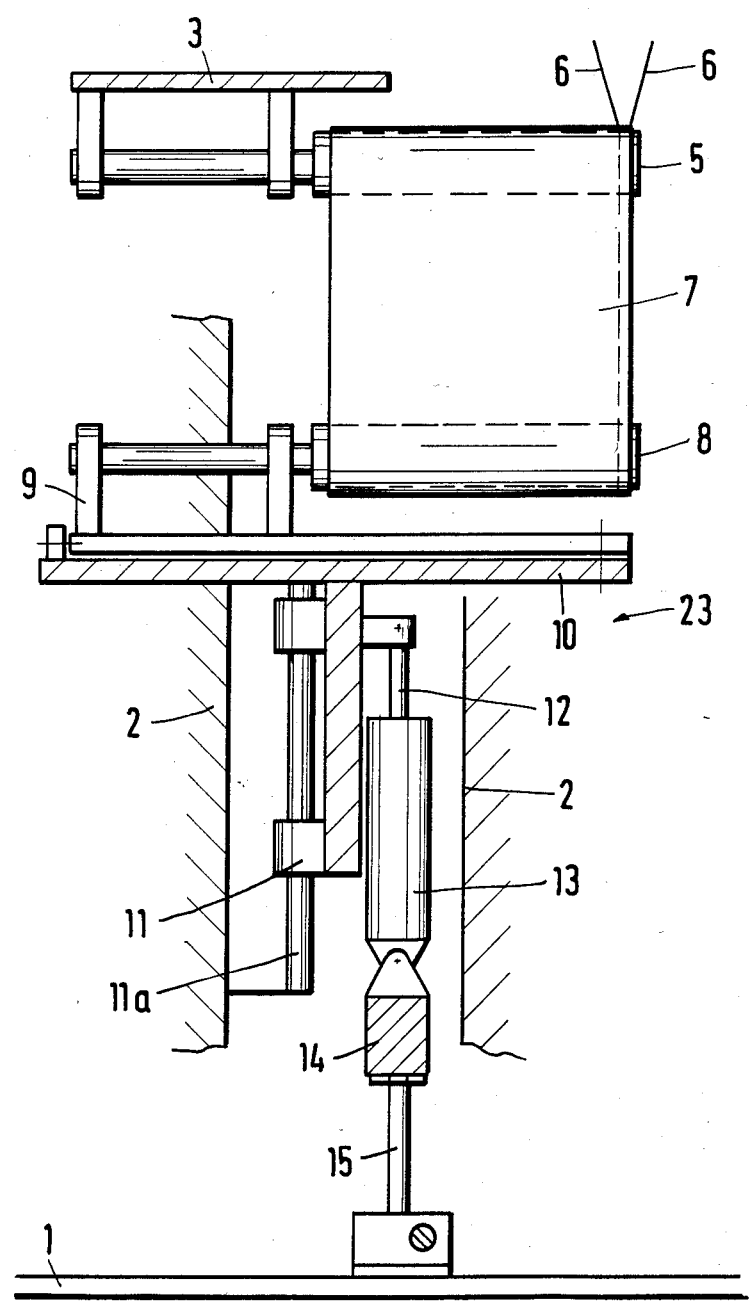
FIG. 2 is a cross-sectional view taken along the line II—II of FIG. 1.
Figure 3:
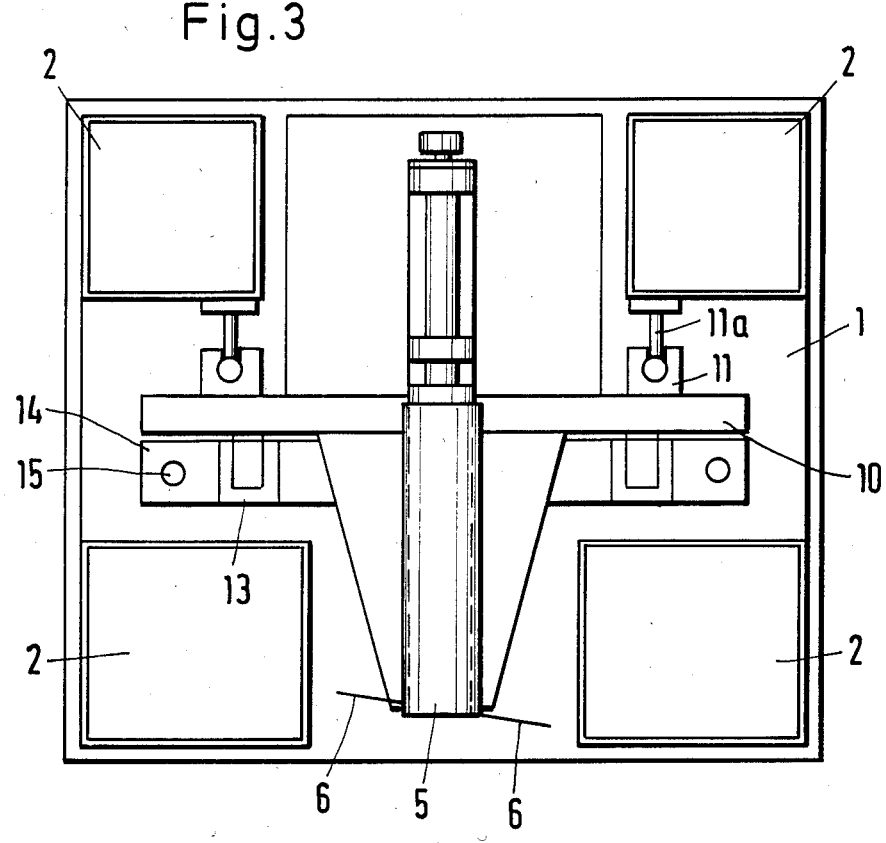
FIG. 3 is a cross-sectional view taken along the line III—III of FIG. 1.

In the drawings, there is shown an apparatus for producing open-sided V-belts which comprises four columns 2 mounted on a base plate 1. The columns 2 and the base plate 1, as best seen in FIG. 3, together with a cover plate 3, form a framework 4.

One end of an upper roller 5 is non-displaceably mounted on the cover plate 3. The other end of the roller 5 is not supported. A sleeve-shaped roll of material to be cut to form a V-belt can therefore be slipped over the roller 5 from the free end thereof. The cutting of the material into individual belts is effected by means of driven rotary cutters 6. The roll 7 is also slipped over a tensioning roller 8 in a manner identical to that described above in connection with the roll 5 and is tensioned thereby. To permit this, one end of the tensioning roller 8 is likewise mounted on a pivotal arm 9 whilst the other end is unsupported.

The tensioning arrangement for tensioning the roll 7 comprises the pivotal arm 9, together with the roller 8, together with a weight member 10 which is connected to the arm 9. The weight member has guide bearings 11 mounted thereon which permit the member 10 to be slidably displaced on shafts 11a. The weight member 10 also has piston rods 12 mounted thereon which are located in pneumatic cylinders 13. It will therefore be seen that the weight of the roller 8, the arm 9, the weight member 10, the bearings 11 and the piston rods 12 all act on the roller 8 tending to cause this latter to move away from the roller 5. This, in turn, obviously tensions a roll 7 located over both rollers 5 and 8.

The pneumatic cylinders 13 are disposed on a crosspiece member 14. The crosspiece member 14 is adapted to be vertically displaceable by means of spindles 15 and a spindle drive 16 through the intermediary of mitre-wheel gears.

The operation of the apparatus will now be descibed. The spindle drive 16 is actuated and causes the spindles 15 to rotate. This causes the crosspiece member 14 to be raised. Since the pneumatic cylinders 13 are securely connected to the crosspiece member 14, the entire tensioning arrangement is moved in an upward direction.

In other words, the weight member 10, as well as the guide bearings 11, the pivotal arm 9 and the tensioning roller 8, which bearings 11 are mounted on the weight member 10, are raised to such an extent that a roll 7 to be cut can be slipped over both of the rollers 5 and 8.

Figure 4:
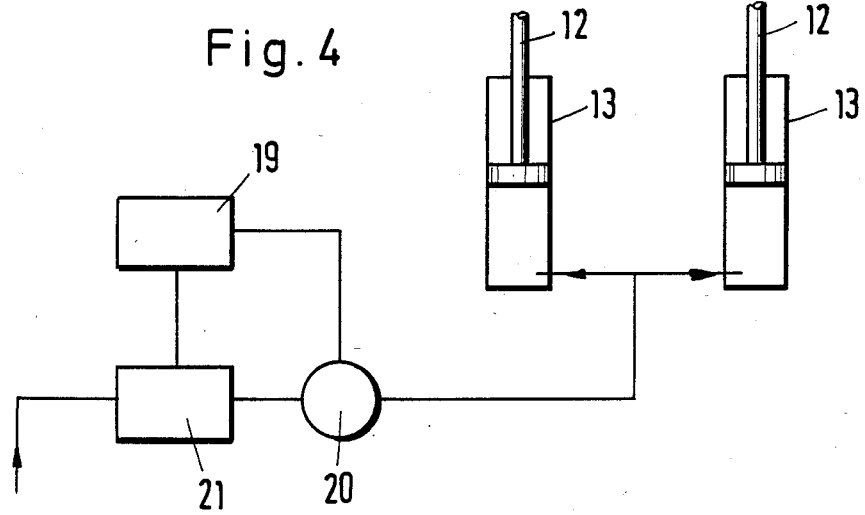
FIG. 4 shows, schematically, control members which may be used for controlling the apparatus shown in FIGS. 1 to 3.

The tensioning force is empirically determined for the particular roll 7 to be cut and is then set. This setting is effected by means of a regulating valve 21 which appropriately regulates the pressure in the cylinders 13 under the control of a computer 19 utilising contact manometers 20 as shown in FIG. 4.

In consequence, the pressure which is specifically and empirically determined for a roll 7 is set in the cylinders 13.

The spindle drive 15, 16 then drives the crosspiece member 14 and the cylinders 13 in a downward direction until the roll 7 abuts against both of the rollers 5 and 8. When this occurs, the roll 7 is tensioned. In tensioning the roll 7, the weight of the tensioning arrangement comprising the roller 8, the pivotal arm 9, the weight member 10, the guide bearings 11 and the piston rods 12, begins to have an effect. In other words, the inherent weight of the tensioning arrangement begins to tension the roll 7. The spindle drive 15, 16 is then disconnected by means of stop members 17 through the intermediary of limit switches 18 when the preselected pressure in the cylinders 13 is attained. At this point, the pressure in the cylinders 13 counteracts a portion of the inherent weight of the tensioning arrangement 8,9,10,11,12. The tensioning arrangement operates, therefore, on the basis of its inherent weight. In practice, the piston rods 12 become withdrawn from the cylinders 13 during the downward movement of the cylinders and the pressure in the cylinders alter. When a predetermined pressure is reached, suitably located stop member 17 and limit switches 18 co-operate with one another and disconnect the drive 15, 16. The roll is thus tensioned by the inherent weight of the tensioning arrangement 8,9,10,11,12, which weight is partially compensated by the counteracting pressure in the cylinders 13.

A drive (not shown) for the roller 5 is then actuated so as to cause the roll 7 to rotate at between 700 and 1,000 revolutions per minute. The cutting operation for severing individual V-belts from roll 7 is then effected by means of the rotary cutters 6 which are driven into the roll.

After a period of time one V-belt will have been cut from the roll and removed. Whilst still rotating around the rollers 5 and 8, the remainder of the roll is displaced by a device (not shown) towards the cutters 6. A further V-belt can then be cut from the roll by driving the rotary cutters 6 once more into the rotating roll 7.

Since the roll 7 becomes narrower after the removal of each severed V-belt, it is necessary to alter the compensating force. This is effected by programming the computer to provide a signal which brings about an increase in the pressure in the cylinders 13 each time a V-belt is removed. The weight of the tensioning arrangement is thus continually counteracted by an appropriate force.

By providing such an arrangement, the inherent weight of the tensioning arrangement 8,9,10,11,12 is counteracted by gradually increasing the pressure in the cylinders 13. Moreover, the increasing absorption of the inherent weight of the tensioning arrangement is not allowed to tension the roll 7 to an insufficient extent. If this occurred, the accurate guidance of the roll on the rollers 5 and 8 would not be ensured. It is vital that the roll be permanently and accurately guided so that an accurate cutting operation can be performed.

The method and apparatus according to the present invention permit a wide roll 7 to be continuously and appropriately tensioned until the last V-belt is cut therefrom. Accordingly, even if only one further V-belt can be cut from a roll, the tensioning arrangement of the present invention will still ensure that the roll is still accurately guided so that this last V-belt can be accurately cut.

I claim:

1. A method of producing open-sided V-belts by cutting from a vulcanised sleeve-shaped roll comprising the steps of disposing said vulcanised roll around first and second roller means, tensioning said roll by the application of a tensioning force thereto, said tensioning force being applied by tensioning means, said tensioning means comprising means operatively connected to said second roller means whereby the weight of said tensioning means acts on said second roller to tend to cause said second roller means to move away from said first roller means thereby tensioning said vulcanised roll and, when a predetermined tensioning force limit is attained, partially counteracting said weight of said tensioning means by applying a force in a direction opposed to said tensioning force so as to resist movement of said second roller away from said first roller, cutting a V-belt from said roll whilst said roll is tensioned, removing said cut-belt and increasing said counteracting force in dependence upon the number of said V-belts cut and removed from said roll.

2. A method of producing open-sided V-belts as recited in claim 1, wherein said tensioning force is empirically determined for each said vulcanised roll and wherein said counteracting force is increased both after said cutting has been effected and after said cut belt which has been removed from the roll, said increase in said force being effected hydraulically to cause the resultant force acting on said roll to be in accordance with said determined values.

3. A method of producing open-sided V-belts as recited in claim 1, wherein said tensioning force is empirically determined for each said vulcanised roll, and wherein said counteracting force is increased both after said cutting has been effected and after said cut belt which has been removed from the roll, said increase in said force being effected pneumatically to cause the resultant force acting on said roll to be in accordance with said determined values.

4. An apparatus for producing open-sided V-belts by cutting from a vulcanised sleeve-shaped roll comprising roll support means, said support means comprising first and second roller means, tensioning means operatively connected to said second roller means such that the weight of said tensioning means acts on said second roller means, said weight causing downward movement of said tensioning means and tending to cause said second roller means to move away from said first roller means, said movement causing tensioning of said roll disposed on said roll support means, guide means for cooperating with said tensioning means to guide said movement, frame means mounting said guide means and weight-counteracting force application means cooperating with said tensioning means, said force application means applying a force in a direction opposed to said weight of said tensioning means so as to resist movement of said second roller away from said first roller when said tensioning force attains a predetermined limit value, cutter means associated with said first roller means for cutting a V-belt from said roll when said roll is tensioned, and control means connected to said force-application means for increasing said weight-counteracting force when a said V-belt has been cut from said roll.

5. An apparatus as recited in claim 4 wherein said weight-compensation force application means comprises pneumatically-operated cylinders.

6. An apparatus as recited in claim 4 wherein said weight-compensation force application means comprises hydraulically-operated cylinders.

7. An apparatus as recited in claim 4, wherein said tensioning means comprises said second roller, mounting means for said second roller, said mounting means comprising a weight member, guide bearings mounted on said weight member and piston rod means mounted on said weight member and pistons carried on said piston rod means.

8. An apparatus as recited in claim 7, wherein said guide members comprise a plurality of shafts extending in parallel to one another, said shafts being guided in said guide bearings.

9. An apparatus as recited in claim 3, wherein said frame comprises a base plate, a plurality of columns screw-connected to said base plate and extending upwardly therefrom, each said column including a free end region remote from said base plate and cover plate means connecting said free end regions of said columns.

10. An apparatus as recited in claim 5 additionally comprising a crosspiece member, said crosspiece member supporting said pneumatically operated cylinders.

11. An apparatus as recited in claim 6 additionally comprising a crosspiece member, said crosspiece member supporting said hydraulically-operated cylinders.

12. An apparatus as recited in claim 5 additionally comprising contact manometer means connected to said pneumatic cylinder, said manometer means producing an output signal, computer means in communication with said manometer means for receiving said output signal and producing a control signal, control means in communication with said computer means and receiving said control signal, said control means controlling the pressure in said pneumatic cylinders in dependence upon said control signal.

13. An apparatus as recited in claim 6 additionally comprising contact manometer means connected to said pneumatic cylinder, said manometer means producing an output signal, computer means in communication with said manometer means for receiving said output signal and producing a control signal, control means in communication with said computer means and receiving said control signal, said control means controlling the pressure in said hydraulic cylinders in dependence upon said control signal.

14. An apparatus as recited in claim 5 additionally comprising lifting means operatively connected to said force application means, said lifting means comprising lifting spindles, actuation of said lifting spindles causing vertical displacement of said tensioning means through the intermediary of said force-application means.

15. An apparatus as recited in claim 5 additionally comprising crosspiece member means supporting said pneumatically-operated cylinders and means for vertically displacing said crosspiece member means, said means for vertically displacing said crosspiece member means comprising a spindle drive.

16. An apparatus as recited in claim 6 additionally comprising crosspiece member means supporting said hydraulically-operated cylinders and means for vertically displacing said crosspiece member means, said means for vertically displacing said crosspiece member means comprising a spindle drive.

17. An apparatus as recited in claim 5 additionally comprising crosspiece member means supporting said pneumatically-operated cylinders and means for vertically displacing said crosspiece member means, said means for vertically displacing said crosspiece member means comprising a spindle drive, stop means disposed on said pneumatically-operated cylinders, limit switches cooperating with said stop members, said cooperation of said limit switches with said stop members disengaging said spindle drive.

18. An apparatus as recited in claim 6 additionally comprising crosspiece member means supporting said hydraulically-operated cylinders and means for vertically displacing said crosspiece member means, said means for vertically displacing said said crosspiece member means comprising a spindle drive, stop means disposed on said hydraulically-operated cylinders, limit switches cooperating with said stop members, said cooperation of said limit switches with said stop members disengaging said spindle drive.

* * * * *